United States Patent [19]

Fujita

[11] 4,433,954
[45] Feb. 28, 1984

[54] APPARATUS FOR ROTATING PALLET

[75] Inventor: Hiromu Fujita, Kyoto, Japan

[73] Assignee: Osaka Taiyu Co., Ltd., Osaka, Japan

[21] Appl. No.: 424,181

[22] Filed: Sep. 27, 1982

Related U.S. Application Data

[63] Continuation of Ser. No. 147,107, May 6, 1980, abandoned.

[51] Int. Cl.³ .............................................. B65G 7/00
[52] U.S. Cl. ...................................... 414/757; 212/253
[58] Field of Search .................. 414/757, 198; 104/35, 104/44, 45, 46; 212/253; 108/103, 139, 154; 248/349

[56] References Cited

U.S. PATENT DOCUMENTS

| 288,408 | 11/1883 | Chew | 248/349 |
| 2,044,031 | 6/1936 | Van Nieuwland | 104/35 |
| 2,933,052 | 4/1960 | Mellam | 104/35 |
| 2,971,801 | 2/1961 | Grundon | 104/46 |
| 3,302,594 | 2/1967 | Barnett et al. | 248/349 |
| 3,338,176 | 8/1967 | Petersen | 104/35 |
| 4,191,437 | 3/1980 | Funke | 248/349 |

FOREIGN PATENT DOCUMENTS

| 159371 | 3/1933 | Fed. Rep. of Germany | 248/349 |
| 769776 | 9/1934 | France | 212/253 |
| 209437 | 4/1925 | United Kingdom | 212/253 |
| 1231388 | 5/1971 | United Kingdom | 248/349 |

OTHER PUBLICATIONS

Anchor Turntables, Bulletin 53A, Anchor Steel and Conveyor Co., Dearborn, Michigan.

*Primary Examiner*—Trygve M. Blix
*Assistant Examiner*—Stephen P. Avila
*Attorney, Agent, or Firm*—Armstrong, Nikaido, Marmelstein & Kubovcik

[57] ABSTRACT

An apparatus for rotating a pallet comprising an annular under ring supporting bearings rotatable in a horizontal plane and bearings rotatable in a vertical plane, and an upper ring provided over the under ring and supported by the vertical bearings. The upper ring is prevented from deflecting laterally by the contact of a peripheral wall on the upper ring with the horizontal bearings.

4 Claims, 6 Drawing Figures

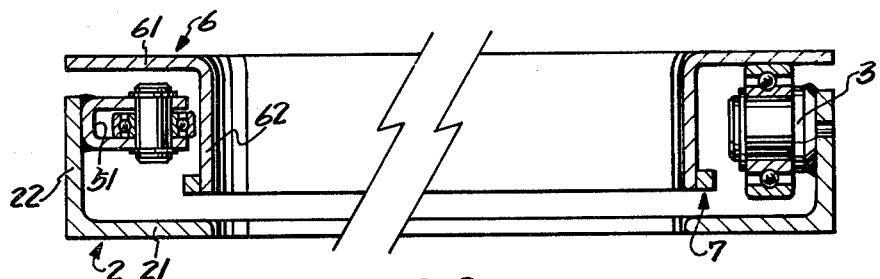
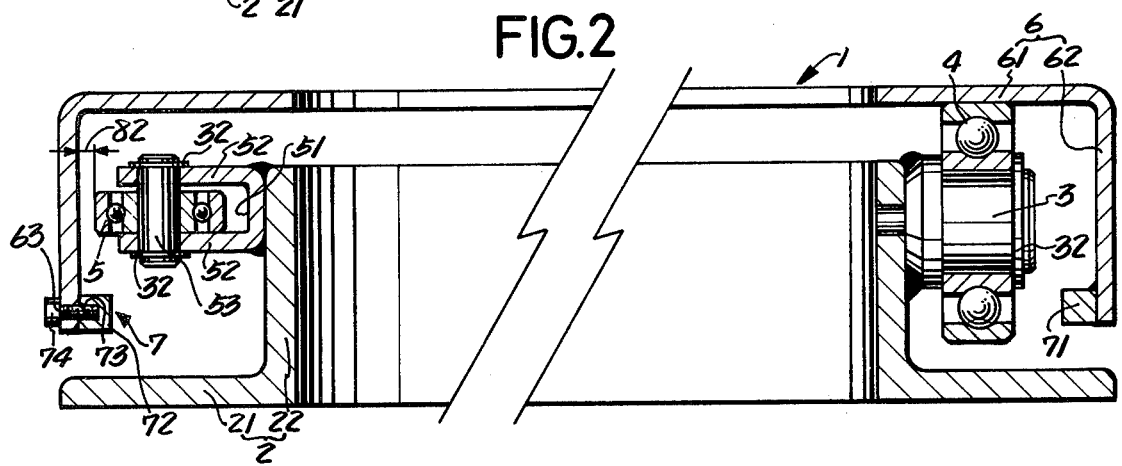
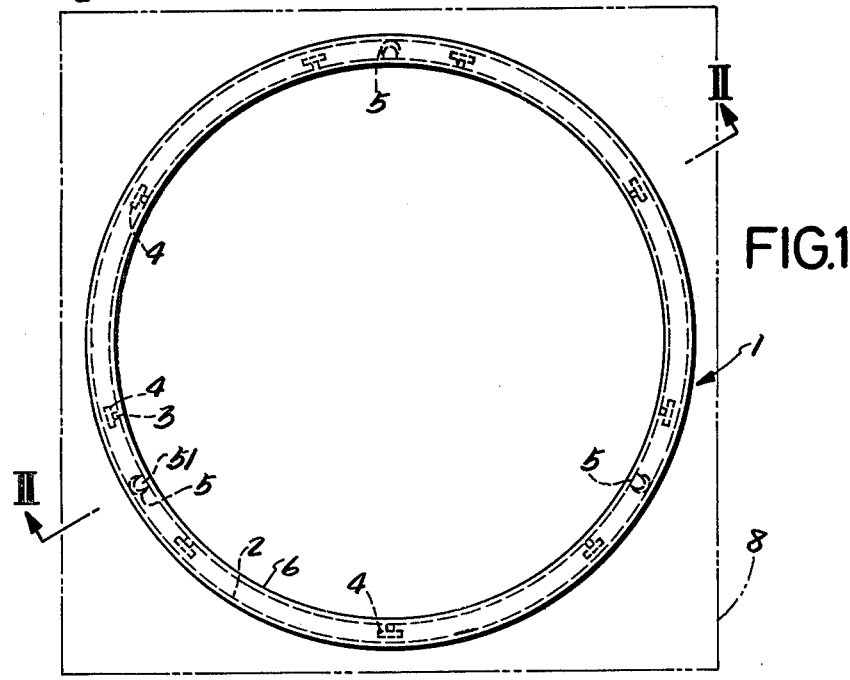

APPARATUS FOR ROTATING PALLET

This is a continuation, of application Ser. No. 147,107, filed May 6, 1980, abandoned.

BACKGROUND OF THE INVENTION

When drums are to be transferred onto a pallet or the drums on the pallet are to be transferred to some other place with use of a drum carrier, the carrier 9 must be brought close to the pallet 8 so that a corner 81 of the pallet 8 will be positioned between the front wheels 91, 91 of the carrier 9 as shown in FIG. 5. Accordingly if the pallet is placed directly on the floor, the carrier requires a large space for access to the four corners of the pallet.

To overcome this problem, I have already invented a pallet rotating apparatus as shown in FIGS. 5 and 6. The apparatus is disclosed in detail in Published Unexamined Japanese Utility Model Application SHO 54-65166and Registered Japanese Design Publication No. 512417.

With reference to FIG. 6, the pallet rotating apparatus comprises an annular under ring 2 and an upper ring 6 fitting over the ring 2. The under ring 2 has a peripheral wall 22 provided with support shafts 3. The upper ring 6 is supported by bearings 4 mounted on the shafts 3. Steel balls 33 each mounted on the forward end of the support shaft 3 are opposed to the peripheral wall 62 of the upper ring 6 to prevent the lateral movement of the upper ring 6.

Since the steel ball 33 is fitted in a cavity 31 formed in the forward end of the support shaft 3 and is prevented from slipping off by a crimped peripheral edge defining the cavity 31, the ball 33 is not smoothly rollable. Further when brought into contact with the peripheral wall 62 of the upper ring 6, the steel ball 33 is forced to roll while producing great frictional resistance by contact with the inner peripheral surface defining the cavity 31 and with its bottom. Eventually, therefore, the ball 33 becomes no longer rollable due to local wear to impede the rotation of the upper ring 6.

SUMMARY OF THE INVENTION

The object of the invention is to provide an apparatus for rotating a pallet which comprises an under ring provided with bearings rotatable in a vertical plane and with bearings rotatable in a horizontal plane, whereby an upper ring is rendered smoothly rotatable while being restrained from moving laterally.

BRIEF DESCRIPTION OF THE DRAWINGS

FIG. 1 is a plan view of an apparatus for rotating a pallet;

FIG. 2 is a view in section taken along the line II—II in FIG. 1;

FIG. 3 is a view in section showing another embodiment of the invention;

DETAILED DESCRIPTION OF THE INVENTION

Figure 4:
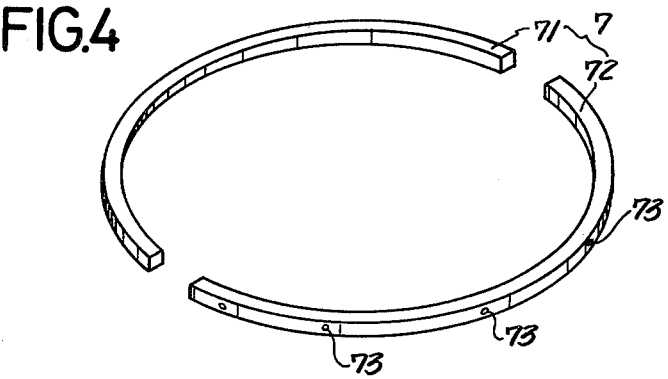
FIG. 4 is a perspective view of a retaining ring.

A pallet rotating apparatus 1 comprises an under ring 2 and an upper ring 6 rotatably fitting over the ring 2.

The under ring 2 is formed by bending an angle bar into an annular form and welding the opposed ends together and includes an annular bottom wall 21 and a peripheral wall 22 extending upward from the inner periphery of the bottom wall 21. The peripheral wall 22 has nine support shafts 3 extending horizontally outward therefrom at the same level and arranged at equal spacing. A bearing 4 is mounted on the shaft 3, with the top of the bearing 4 projecting upward beyond the upper end of the peripheral wall 22. The support shaft 3 has a snap ring 32 for preventing the bearing 4 from slipping off.

The peripheral wall 22 of the under ring 2 is further provided with three brackets 51 horizontally projecting from its outer surface and arranged at equal spacing. Each of the brackets 51 carries a bearing 5 which is rotatable in a horizontal plane.

The bracket 51 is formed by bending a rectangular metal plate into a U-shape and has a base end welded to the peripheral wall 22. A shaft 53 extends vertically through and is fitted to the upper and lower support plates 52, 52 of the bracket 51. The bearing 5, which is rotatable in a horizontal plane, is mounted on the vertical shaft 53 between the support plates 52, 52. The phantom circle circumscribing the outer side surfaces of the three bearings 5 rotatable in the horizontal plane is slightly larger in diameter than the phantom circle circumscribing the outer end surfaces of the support shafts 3.

Snap rings 32, 32 are fitted to both ends of the vertical shaft 53 to retain the shaft in position.

The upper ring 6 fitting over the under ring 2 has approximately the same diameter as the ring 2. The upper ring 6 is made by bending an angle bar into an annular form and welding the opposed ends together and includes an annular top plate 61 positioned on the bearings 4 and a peripheral wall 62 extending downward from the outer periphery of the top plate 61.

The peripheral wall 62 has such an inside diameter that there is formed a clearance 82 of about 2 mm between the wall 62 and the outer ends of the horizontal bearings 5 on the under ring 2.

Bolt holes 63 are formed in the peripheral wall 62 as equidistantly arranged along the lower edge of the wall 62 over approximately one half of its circumference. A semicircular arc retaining piece 71 is welded to the inner surface of the peripheral wall 62 at its lower edge over the other half of the circumference of the wall 62. As illustrated in FIG. 4, a retaining ring 7 comprises the combination of two semicircular retaining pieces 71, 72 in conformity with the inner periphery of the wall 62. The ring 7 has an inside diameter smaller than the diameter of the phantom circle circumscribing the outer sides of the horizontal bearings 5 to prevent the upper ring 6 from slipping off.

The retaining piece 72 is formed in its outer peripheral surface with threaded bores 73 in corresponding relation to the bolt holes 63 in the upper ring 6.

To assemble the upper ring 6 and the under ring 2, the upper ring 6 is placed over the under ring 2 having the bearings 4, 5 mounted thereon in advance. Subsequently the retaining piece 72 with the threaded bores 73 is fitted to the lower end of the upper ring 6 through the space between the rings 6 and 2, with the threaded bores 73 in register with the bolt holes 63 of the peripheral wall 62, and bolts 74 are screwed into the bores 73 through the holes 63.

The apparatus of the invention will be used in the following manner.

Figure 5:
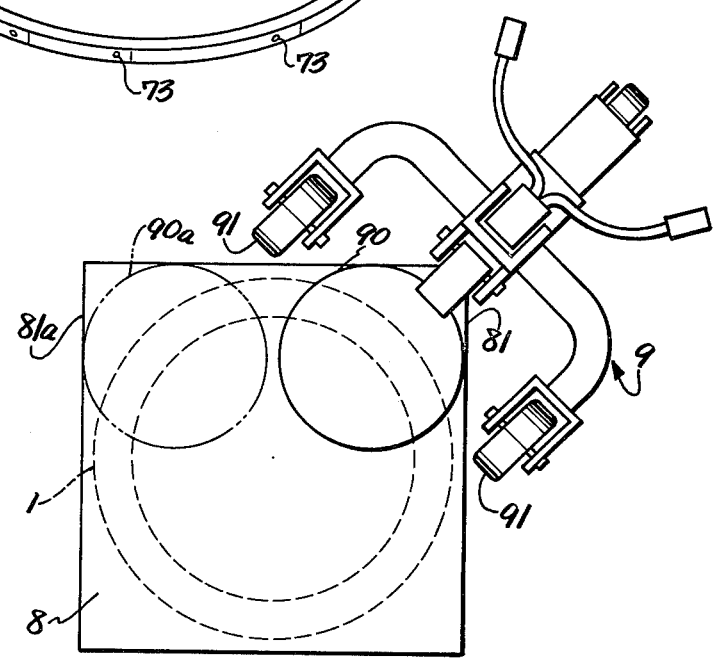
FIG. 5 is a plan view showing the pallet rotating apparatus during use.
Figure 6:
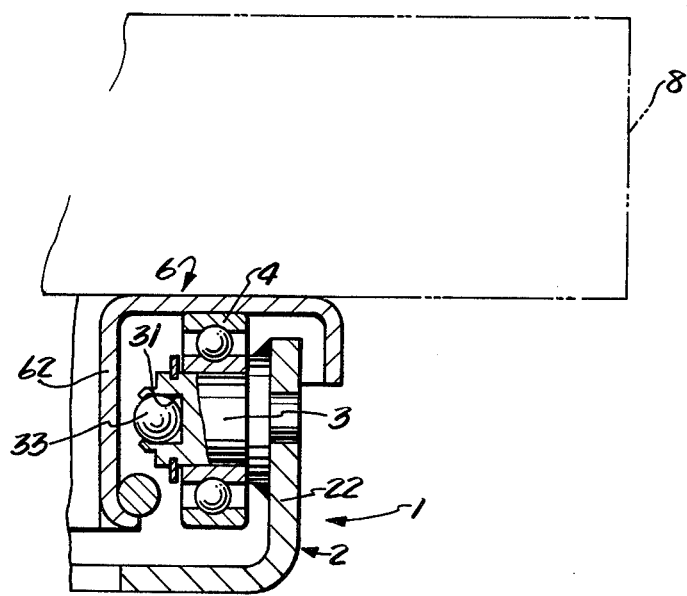
FIG. 6 is a sectional view showing a known pallet rotating apparatus invented by me.

The apparatus is placed on the floor with the under ring 2 down, and a pallet 8 is set on the upper ring 6. As seen in FIG. 5, the pallet 8 is turned in a horizontal plane to position a corner 81 of the pallet 8 in the path of advance of a carriage 9, and a drum 90 carried on the carrier 9 is transferred onto the pallet. The carriage 9 is moved away from the corner 81, the pallet 8 turned again in the horizontal plane to direct an empty corner 81a in the next position toward the path of advance of the carriage 9, and the next drum 90a transferred onto the pallet. By repeating the above procedure, four drums can be transferred onto the pallet from one direction. The pallet 8 is smoothly rotatable with stability and free of any backlash since it is uniformly supported on its rear side at outward portions thereof by the upper ring 6 which in turn is supported on the bearings 4. Even when the pallet 8 is subjected to a lateral force or the upper ring 6 is eccentric with respect to the under ring 2, the peripheral wall 62 of the upper ring 6 will bear against the horizontal bearing 5 on the under ring 2 and rotate the bearing, thus permitting the pallet 8 to rotate free of any trouble. The pallet 8 can be unloaded in the same manner as above, namely, by turning the pallet 8 to transfer the drums onto the carriage 9 in one direction.

When the upper ring 6 is lifted for the transport of the pallet rotating apparatus 1, the retaining ring 7 bears on the horizontal bearings 5 on the under ring 2, preventing the upper ring 6 from separating from the under ring 2. The apparatus is therefore convenient to transport.

The pallet rotating apparatus 1 is usable upside down. When the upper ring 6 is placed directly on the floor with the pallet 8 set on the under ring 2, the pallet 8 is rotatable similarly smoothly in a horizontal plane.

MODIFICATION OF THE INVENTION

As shown in FIG. 3, the peripheral wall 22 of the under ring 2 can be provided on the outer periphery of the bottom wall 21, and the peripheral wall 62 of the upper ring 6 provided on the inner periphery of the top wall 61 so that the peripheral wall 22 of the under ring 2 will surround the peripheral wall 62 of the upper ring 6. In this case, the bearings 4, 5 are mounted on support shafts 3 and brackets 51 on the inner surface of the peripheral wall 22 of the under ring 2, with the retaining ring 7 attached to the outer surface of the peripheral wall 62 of the upper ring 6 at its lower end.

The scope of the invention is not limited to the foregoing description and the disclosure of the accompanying drawings, but various modifications may be readily made by one skilled in the art without departing from the spirit of the invention. Such modifications are therefore included in the scope of the invention.

What is claimed is:

1. A portable apparatus for rotating a pallet consisting of an annular under ring having a flat bottom wall, a peripheral wall extending upwardly from the bottom wall forming an L-shaped cross-section, and a plurality of bearings arranged on a circumference on said peripheral wall, some of said plurality being rotatable in a vertical plane and the others being rotatable in a horizontal plane; and an annular upper ring provided over the under ring and supported rotatably on the bearings rotatable in a vertical plane, the annular upper ring having a flat top wall, a peripheral wall projecting downwardly from the top wall positioned close to the bearings rotatable in a horizontal plane, the top wall and the upper ring peripheral wall forming a L-shape cross-section opposite in orientation to that of said under ring and a retaining ring along the lower edge of the peripheral wall of the upper ring projecting toward void space beneath the bearings rotatable in a horizontal plane.

2. A portable apparatus as defined in claim 1 wherein the retaining ring comprises two divided substantially semicircular pieces, one of the retaining pieces being fixedly welded to the peripheral wall of the upper ring, the other retaining piece being attached to the peripheral wall of the upper ring with bolts.

3. A portable apparatus as defined in claim 1 wherein the bearings rotatable in a horizontal plane and in a vertical plane are supported by horizontal brackets holding vertical shafts and horizontal support shafts respectively, said brackets and said horizontal support shafts projecting outwardly from the outer peripheral surface of an inner peripheral wall on the under ring.

4. A portable apparatus as defined in claim 1 wherein the bearings rotatable in a horizontal plane and in a vertical plane are supported by horizontal brackets holding vertical shafts and horizontal support shafts respectively, said brackets and said horizontal support shafts projecting inwardly from the inner surface of an outer peripheral wall on the under ring.

* * * * *